United States Patent [19]
Bryan-Brown

[11] Patent Number: 5,312,754
[45] Date of Patent: May 17, 1994

[54] COMPOSTING APPARATUS AND SYSTEM

[76] Inventor: Michael Bryan-Brown, 237 E. 10th St., #6B, New York, N.Y. 10003

[21] Appl. No.: 842,538

[22] Filed: Feb. 27, 1992

[51] Int. Cl.$^5$ .......................... C12M 1/06; C12M 1/38
[52] U.S. Cl. ........................ 435/290; 435/315; 422/184; 366/106; 366/275
[58] Field of Search .................. 435/287, 290, 299–301, 435/311, 313, 315, 316, 818; 422/184; 366/101, 106, 107, 275; 405/128, 129; 71/8, 9, 901; 24/DIG. 38; 423/DIG. 18; 220/908, DIG. 30

[56] References Cited

U.S. PATENT DOCUMENTS

| | | |
|---|---|---|
| 1,405,952 | 7/1922 | Stuart . |
| 1,980,244 | 11/1934 | Wright ........................ 71/9 |
| 2,683,368 | 7/1954 | McDowell .................. 366/275 |
| 2,734,803 | 2/1956 | Ruskin ........................ 71/9 |
| 3,190,725 | 6/1965 | Van Den Berg ............ 71/9 |
| 4,046,689 | 9/1977 | Argyll . |
| 4,274,838 | 6/1981 | Dale et al. ................. 435/313 |
| 4,374,804 | 2/1983 | Easter ........................ 422/184 |
| 4,414,335 | 11/1983 | Kipp, Jr. ................... 435/313 |
| 4,426,020 | 1/1984 | Presseau ................... 222/108 |
| 4,659,472 | 4/1987 | Nordlund .................. 210/609 |
| 4,728,004 | 1/1988 | Bonerb ...................... 222/61 |
| 4,956,002 | 9/1990 | Egarian ..................... 71/9 |
| 5,049,486 | 9/1991 | Blackwood et al. ...... 435/290 |
| 5,080,786 | 1/1992 | De Lima ................... 210/218 |

FOREIGN PATENT DOCUMENTS

| | | |
|---|---|---|
| 0127769 | 12/1984 | European Pat. Off. ........... 435/287 |
| 2917048 | 11/1980 | Fed. Rep. of Germany ...... 422/184 |
| 3408454 | 9/1985 | Fed. Rep. of Germany ...... 435/287 |
| 3637393 | 8/1987 | Fed. Rep. of Germany ...... 71/9 |
| 3837865 | 5/1990 | Fed. Rep. of Germany ...... 435/290 |
| 0209895 | 12/1982 | Japan ........................ 435/287 |
| 1018494 | 1/1989 | Japan ........................ 422/184 |
| 1124379 | 5/1989 | Japan ........................ 435/286 |

*Primary Examiner*—Michael G. Wityshyn
*Assistant Examiner*—William H. Beisner

[57] ABSTRACT

The present invention is a compost apparatus that is simple, economical, reliable and may be transportable, yet contains all odorous emissions. Odorous materials are handled in a fully enclosed manner using containers which may be capable of providing in-vessel agitation using pressurized air. The container consists of side walls and a bottom wall. A cover may also be included. A perforated second floor is positioned above the bottom wall for supporting organic waste. The container is capable of allowing pressurized air to be introduced between the perforated second floor and the bottom floor for aerating the organic waste. The container is further capable of allowing odorous gases collected within the container to be exhausted. A bladder may be positioned within the container to agitate the organic waste load.

4 Claims, 6 Drawing Sheets

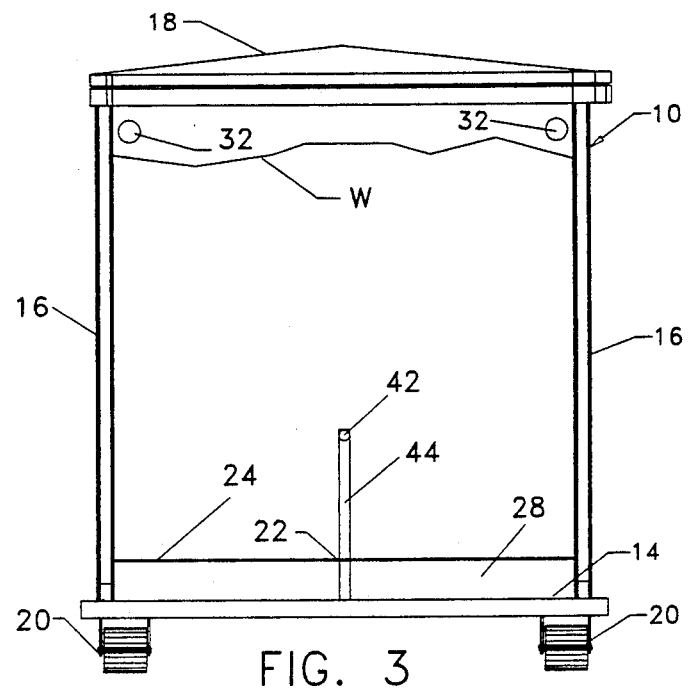
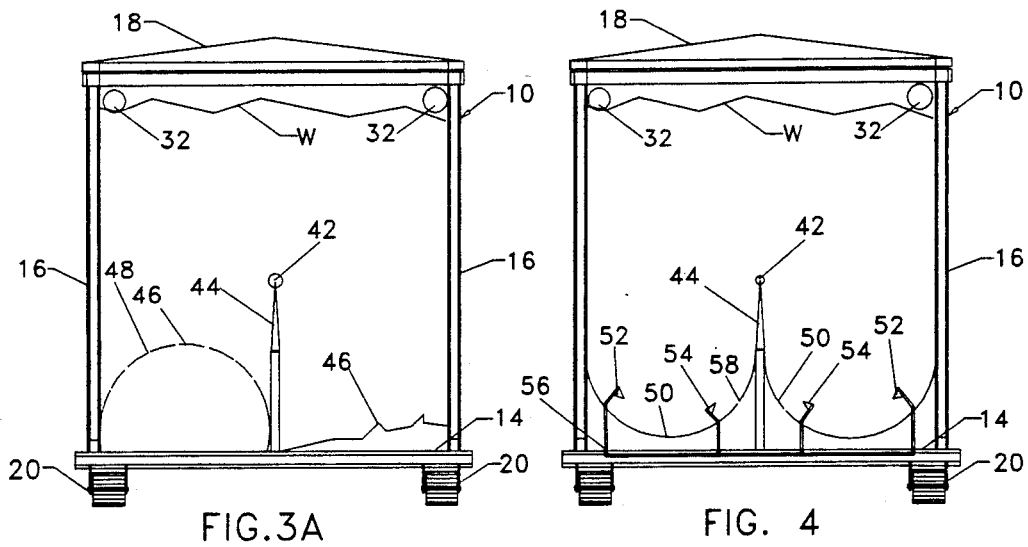

COMPOSTING APPARATUS AND SYSTEM

FIELD OF THE INVENTION

This invention relates to a transportable or stationary composting apparatus and a system for converting organic wastes to compost. In particular, to composting containers that enclose the organic wastes during composting and provide agitation and aeration powered by pressurized air and collect and remove odorous emissions for purifying.

Composting is rapidly becoming a viable solid waste management alternative as landfill space dwindles. As much as 40% of municipal solid waste (MSW) may be composted, including food waste, yard waste and paper products. In addition, composting is also used to stabilize sewage sludge and to bioremedially degrade hazardous and industrial wastes. The composting process reduces the volumn of the organic waste by 50% or more while producing a stable, humus-like material which is non-odorous. The finished compost product may be sold as fertilizer, landfill cover or for other purposes.

Treatment of municipal organic waste can generally be divided into four stages. The first stage generally involves sorting, shredding and mixing the organic waste in preparation for composting. The second stage is the rapid aerobic thermophilic decomposition of organic waste into a more stable compost. A curing stage further stabilizes the compost at a slower rate of decomposition. Final processing involves screening the compost of contaminants to create a finely grated compost product. The equipment required depends on the solid organic waste to be composted and the specifications for the compost product.

DESCRIPTION OF THE PRIOR ART

Compost facilities generally rely on bucket loaders or conveyors to transport and mix odorous organic wastes prior to composting. Neither bucket loaders nor belt conveyors enclose the organic waste; therefore, odors are freely emitted from the exposed surfaces of the organic waste. The organic wastes coat the surface of the conveyors and greatly increase the odor emissions. In addition, bucket loaders drop organic wastes and spread them over the compost site.

At present, there are several composting technologies available for large scale composting of organic wastes. The method of maintaining aerobic conditions in the compost mass depends on the type of organic waste composted. Homogeneous wastes such as sludge mixed with wood chips are commonly composted under static conditions ("static" because the compost mass is not agitated or turned during the active compost cycle of approximately 21 days). Aeration is provided to the static compost mass by blowing air through the material. Heterogeneous wastes, such as mixed municipal solid waste, generally require agitation in order to provide even aeration during composting.

The most common means of composting is to arrange shredded and mixed organic waste in open piles, as in windrows. The piles may be aerated with air blowers or the piles may periodically be turned or agitated to expose the organic waste to air.

The organic waste is most often transported and arranged in piles using a front end loader. Turning the waste is also done by a front end loader or a windrow turning machine.

After the waste is composted, it is frequently screened to separate the fine compost from larger less degradable material. One screen suitable for sifting compost is a trommel screen which is an inclined rotating drum made of mesh. The fine material falls through the mesh and is collected and fed by a conveyor to a holding place.

In-vessel processes were developed to overcome some of the disadvantages of pile composting by enclosing the compost process in a reactor vessel and mechanizing the materials handling and mixing of organic wastes. In-vessel systems to date have been complex engineered systems which require precision construction techniques and permanent, stable foundations. The reactor vessels are typically silos, long concrete tunnels or bins. Organic waste is fed into the opening of the reactor and compost is removed from the other end. Aeration is provided by pressurized air forced through the organic waste. In-vessel systems may provide mechanical agitation within the reactor vessel, or the compost mass may remain static. To date, agitation systems have been of the mechanical type using paddles, screws and the like. The mechanical agitation systems are expensive, prone to wear and failure and only provide intermittent agitation to the composting waste.

The first generation of in-vessel compost facilities have been constructed and are operating in the United States. The principle design flaws of these facilities are related to control of odorous emissions and costly, unreliable materials handling equipment as outlined in an EPA summary report, *In-vessel Composting of Municipal Wastewater Sludge*. Composting processes to date have generated odors which are now the primary concern of municipalities. Less than 5 years ago, odor control was not a principal design criteria; but now many existing facilities are being forced to undergo expensive renovations in order to reduce off-site odor impacts.

In order to collect and control odor emissions, all processes need to be enclosed. Potential sources of odor emissions must be kept to a minimum by reducing the handling of organic waste. Further designs will require cost effective odor free operation in order to become widely accepted as a solid waste management option.

The in-vessel reactor provides for collection of odorous emissions by enclosing the compost process. In-vessel reactors may operate continuously by adding additional organic waste to the head of the vessel every day. Or, the reactors may be modular with a series of vessels which receive a batch of organic waste which remains in the vessel for the compost cycle. Reactors which operate on a continuous basis are more prone to operating problems due to the varying stages of composting within the reactor. If the reactor has to be shut down due to mechanical failure, then the entire process train must be taken off-line and significant operating capacity may be lost.

Loading and extracting the compost material from the in-vessel reactors has been accomplished using automated equipment such as belt and screw conveyors. This equipment is expensive and requires feedback controls to ensure that the entire process train is operational. If one section of a conveyor system fails, then the feedback controls must shut-down the entire train in order to prevent material from piling up on the broken conveyor. Failure of extraction equipment within the compost reactor requires removal of the reactor contents by other means in order to repair the broken contents. In all, conveying materials and containing odors are the most problematic tasks for in-vessel composting.

A search of the prior art developed the following:

| STURAT | U.S. Pat. No. 1,405,952 |
| WRIGHT | U.S. Pat. No. 1,980,244 |
| RUSKIN | U.S. Pat. No. 2,734,803 |
| VAN DER BERG | U.S. Pat. No. 3,190,725 |
| ARGYLE | U.S. Pat. No. 4,046,689 |
| KIPP | U.S. Pat. No. 4,414,335 |
| PRESSEAU ET AL | U.S. Pat. No. 4,426,020 |
| NORLAND ET AL | U.S. Pat. No. 4,659,472 |
| BONERB | U.S. Pat. No. 4,728,004 |
| EGARIAN | U.S. Pat. No. 4,956,002 |

U.S. Pat. No. 4,414,335 attempts to address some of the disadvantages of the first generation of in-vessel systems by providing rail cars as composting vessels. The organic waste is loaded into the top of the car and moved on tracks to an unknown location to undergo partial decomposition. The partially decomposed organic waste is then discharged from the rail car and conveyed back to the loading area where it is recharged into another car. The purpose of this procedure is to mix and aerate the partially decomposed organic waste in order to improve the rate of composting. Practical methods of agitating and removing the compost material from the cars remain unresolved in this patent. The proposed systems require specialized equipment and rail track which would greatly increase the cost of the facility. In addition, no provisions are made in the invention for the containment of odorous emissions. Because of these and other reasons, this invention has yet to be utilized even though it has been issued for almost a decade.

An object of the present invention is to overcome the deficiencies of this and other prior art compost systems by using air-powered agitation and existing containerized materials handling systems for use in composting while providing containment of odorous emissions.

SUMMARY OF THE INVENTION

The present invention provides a compost apparatus and system that is simple, economical and reliable, yet contains all odorous emissions. Odorous materials are handled in a fully enclosed manner using containers, which are capable of providing in-vessel agitation, using pressurized air.

The improved containers according to one embodiment of the invention must be portable. They must be capable for example, of being unloaded onto, and transported by a vehicle such as a truck. The containers are moved by equipment independent of the container. Such containers are used frequently for shipping and garbage collecting. But, as far as is known, none have been modified for use in composting. The primary advantage of the containers is that they enclose the organic waste to reduce odors during composting or during transport. The containers also simplify materials transport. The containers are inexpensive, and equipment is readily available for loading, transporting and dumping the containers. The containers are modular and require no permanent foundation. Therefore, the system may be readily expanded and unstable areas such as landfills may be used as sites for the container.

The first embodiment of the invention includes a movable container with a temperature controlled aeration system that provides a vessel for aerobically composting organic wastes. The mobile container has a preforated floor for admitting pressurized aeration air to the compost mass and temperature sensors for controlling an aeration blower. The container has a cover to completely enclose the compost mass. Exhaust ducts beneath the cover provide for the collection of odorous off-gases. The container may have a separate aeration system or may be connected to aeration plenums which provide air to many containers.

The consistency of the organic waste determines whether agitation will be required during the compost process. If no agitation is required, then the container is fitted with a stationary aeration floor and the compost remains static. When required, the composting container provides for agitation of the organic waste while enclosed in the container. Pressurized air is used to agitate the organic waste to improve the rate of decomposition. Agitation is achieved by including inflatable bladders at the base of the container. Pressurized air alternately inflates and deflates the inflatable bladders. When inflated, the bladder pushes up and slowly turns the organic waste. The pressurized bladder requires no additional mechanical parts to agitate the waste in the compositing container. A second embodiment involves the use of pressurized air to agitate compost in a stationary compost system. Like the containerized system, the stationary system is simple and economical to operate and has a low capital cost. The stationary system is weather-proof, and requires no foundations of protective structures. In addition, the stationary system is light-weight and collapsible, and may be brought into existing buildings. The stationary system is intended for organic wastes which require regular agitation.

The compost is held in a fabric sling formed by two layers of fabric which is sealed to form an inflatable bladder. The top layer may be previous or perforated to allow pressurized air to aerate the organic waste, while the bottom layer is impervious. Or the entire bladder may be impervious, and aeration may be provided by separate aeration ducts. Pressurized air inflates the bladder and pushes the composting material up and onto sloping side walls. As the bladder deflates, the compost falls back into the fabric sling thereby turning, agitating and aerating the organic waste. Temperature sensors mounted on the sloping walls signal blowers to activate the aeration cycle.

The stationary system may operate as a batch system or as a continuous type reactor. As a batch system, the organic waste is loaded into the stationary system at one time and remains in the reactor through out the compost cycle. The continuous type system admits organic waste at one end of the bladder and pushes the composted organic waste out the other end of the bladder. A portion of the bladder at the beginning of the system is not covered by organic waste and remains partially inflated. When the new organic waste is added to the front end of the bladder, the bladder is inflated starting at the front end of the bladder. As the bladder inflates from beginning to end, the rising bladder pushes a wave of organic waste along the length of the bladder. Whereby the composted organic waste at the end of the bladder is pushed into a container where it may be removed from the stationary system. Other configurations include several bladders placed side-by-side to allow the compost to be discharged from one bladder into an adjoining bladder in succession.

Both the transportable and stationary versions of the compost system may be supported by a processing building to enclose equipment for preparing the organic waste for composting. The process building is small and only encloses the processing equipment, not the composting vessels. The composting vessels surround the processing building and are weather-proof. Whenever possible, materials are transported in containers within the processing building to reduce odor emissions and to prevent spillage of the organic waste.

The bladder may also be perforated to admit air to the organic waste through the surface of the bladder.

BRIEF DESCRIPTION OF THE DRAWINGS

FIG. 3 is a cross-sectional view taken along the line 3—3 of FIG. 1;

FIG. 3a is a cross-sectional view similar to FIG. 3 of a first modified form of the invention;

FIG. 4 is a cross-sectional view similar to FIG. 3 of a second modified form of the invention;

DESCRIPTION OF THE PREFERRED EMBODIMENTS

Figure 1:
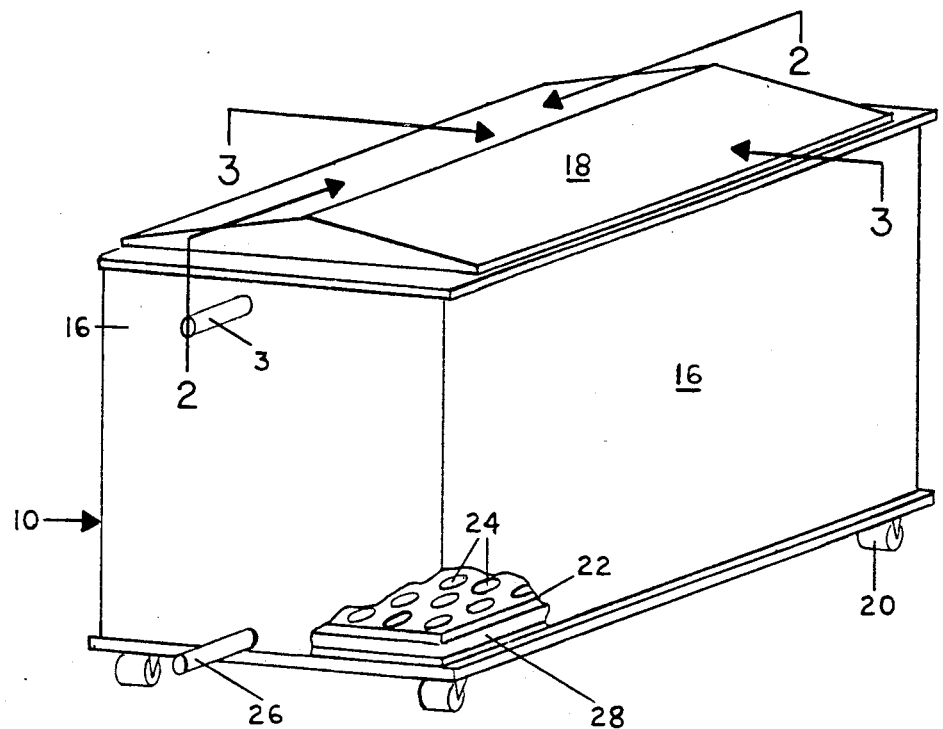
FIG. 1 is a perspective view of a composting container embodying a preferred form of the invention.

Referring to the drawings, and in particular to FIG. 1, there is shown a transportable composting container 10 of the roll-off container type, often identified with dumpsters that are rolled on and off trucks. Another container that can be used is a shipping container that is easily picked up by a forklift. Container 10 has a bottom wall 14, and side and end walls 16, and a movable cover 18. Container 10 has caster wheels 20 for moving the container on the ground and onto a truck bed, not shown. Above container bottom wall 14 is a second floor 22 having perforations 24 therethrough. Pressurized air is introduced into container 10 by an air hose 26 through a space 28 between bottom 14 and floor 22 and through perforations 24 to aerate waste W, see FIG. 2.

Figure 5:
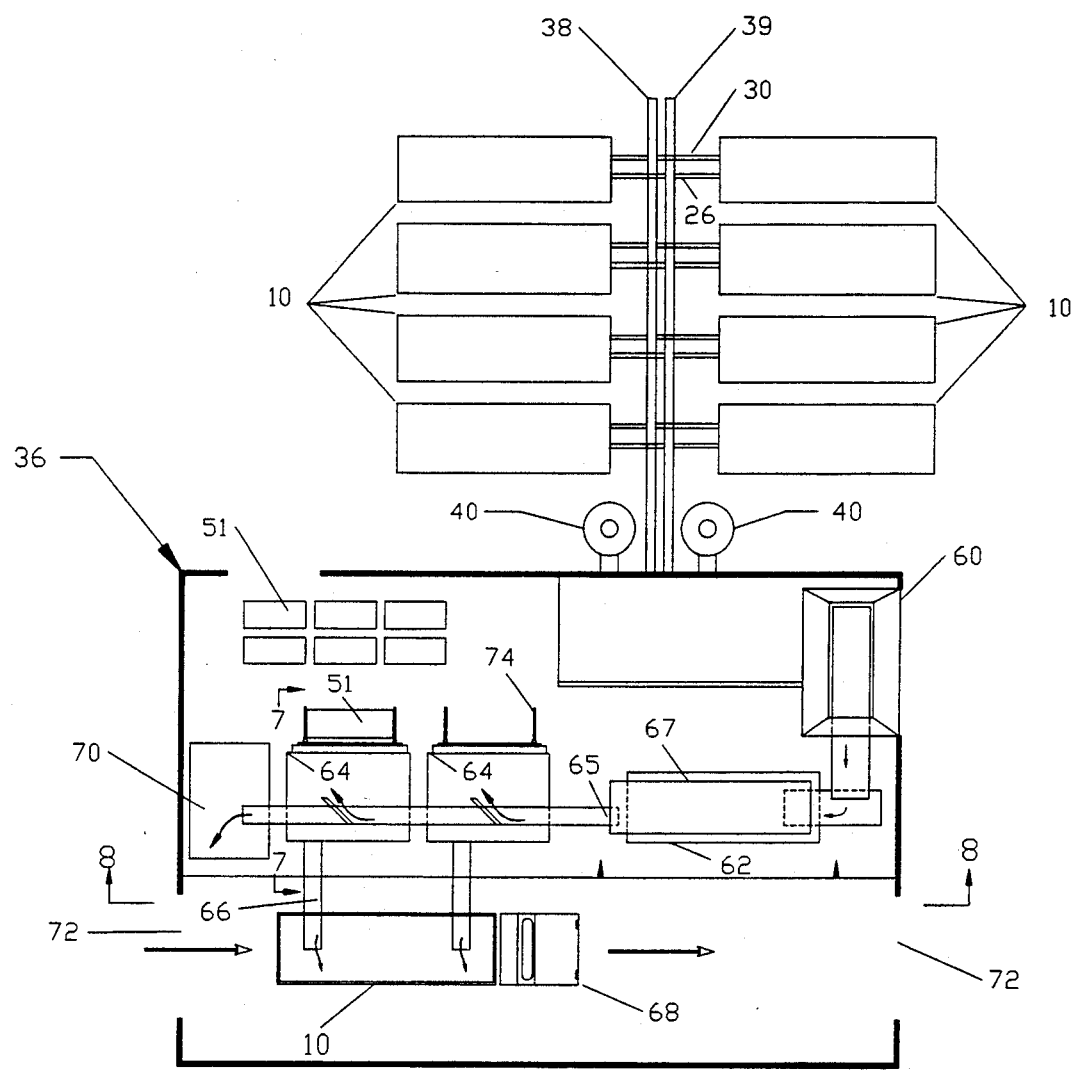
FIG. 5 is a top plan view of a series of containers connected to each other and to a processing plant.

Odors are removed from the container 10 through an exhaust conduit 30. Exhaust conduit 30 is connected to a scrubber, not shown, where the odorous air is scrubbed to remove all the odors and purify the air. Inside container 10, exhaust conduit 30 is attached to a conduit 32 which runs around the inside walls of the container adjacent top wall 18. Conduit 32 has a plurality of orifices 34 which communicate with the interior of container 10 to remove odiferous gases. A plurality of containers 10 may be connected via exhaust conduits 30 and pressurized air hose 26 to a processing building 36 as shown in FIG. 5. The exhaust conduits 30 connect to a manifold 38 which carries the odiferous gases to an odor control apparatus 40. Processing building 36 handles the raw incoming waste to shred and screen nonorganic materials. In addition, when bulking agents, such as wood chips are added to the solid waste, the agents may be separated from the composted waste; therefore, a bulking agent hopper, conveyor and trommel screen to recycle the agents, and to remove non-organic wastes, are used.

Figure 2:
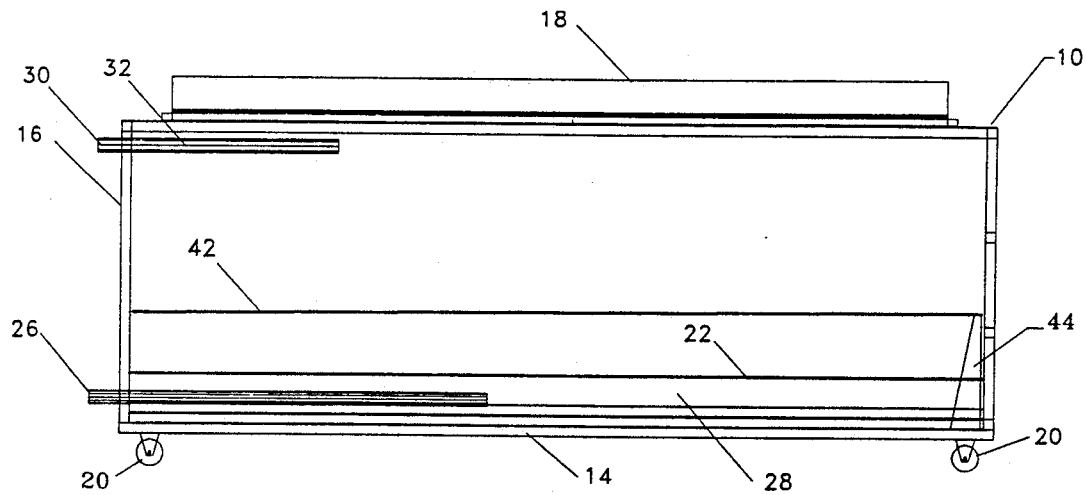
FIG. 2 is a cross-sectional view of the composting container taken along the line 2—2 of FIG. 1.

Referring to FIG. 2, a conduit 42 is stretched between end walls 16 of the container and is supported on posts 44 provided on bottom wall 14. Wire 42 is disposed at an appropriate height so as to measure the temperature of organic waste W. By the use of thermisters mounted on conduit 42, thermisters are connected to a monitor, not shown, to read the temperature readings and to signal a pressurized air blower, also not shown, to turn on or off.

Pressurized air is introduced via line 26 into space 28 and through perforations 24 in floor 22 to aerate and agitate solid organic waste "W" when a signal from the thermisters indicate that the temperature has changed. As the waste decomposes, odiferous gases given off are removed through exhaust conduits 30 and 32.

FIG. 3a shows a modified transportable container 10' which has been modified by the addition of a fabric bladder 46 that is secured along the edges of floor 22 and at specific locations to create a plurality of bellows across the floor when the bladder is filled with air.

Bladder 46 has a plurality of perforations 48 for aerating the solid waste "W". In FIG. 3a the flexible diaphragm bladder 46, made of rubber or abrasion resistant fabric, is expanded by pressurized air blown into space 28 and through perforated floor 22 to first inflate the bladder and then to exit through the perforations 48 into waste "W".

In the embodiment 10" of FIG. 4, there are a pair of arcuate floor sections 50 with air nozzles 52 and 54. A pressurized air system 56 is connected to air nozzles 52 and 54 to help break up any clogs. The air is injected into the compost waste by horizontal nozzles 58, which point toward the center of container 10". Nozzles 52 and 54 push the waste upward in order to turn the compost over. Pressurized air is supplied by a compressor and storage tank, not shown, to create the periodic surges in pressurized air.

Figure 6:
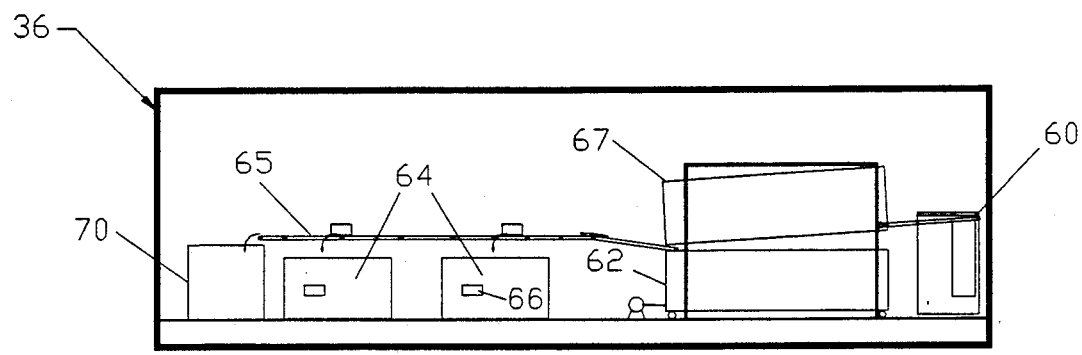
FIG. 6 is a side elevational view of the processing plant of FIG. 5.
Figure 7:
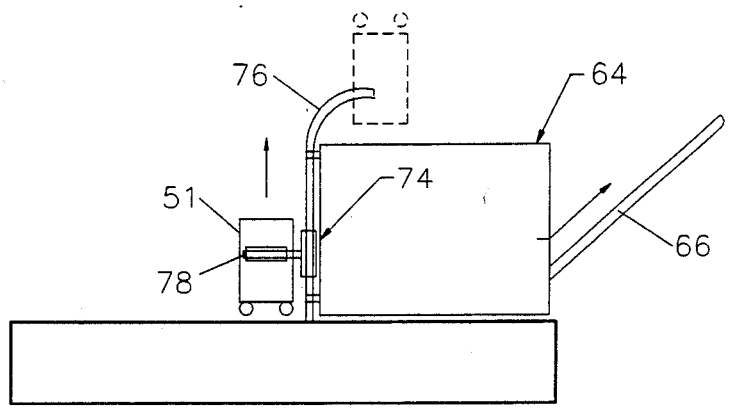
FIG. 7 is a side view taken along the line 7—7 of FIG. 5.

Turning to FIGS. 5 and 6, the processing building 36 handles the raw incoming waste to prepare the waste for composting. The material enters the processing building 36 in containers 51. The containers are emptied into a batch mixer by a hydraulic front loader 74. FIG. 7 shows a batch mixer 64 and front loader 74 for emptying waste containers 51. The waste container 51 slides onto forks 78 which lift container 51 and empty the raw organic waste into the mixer 64. The mixed organic waste is discharged by conveyor 66 into the composting container 10 mounted on a roll-off truck 68. The truck 68 passes through a drive thru passage 72 and out onto the yard for composting. The container 10 is then connected to the aeration header and exhaust header 38 for composting.

Once the compost process has been completed, container 10 is returned to the process building 36 and dumped into hopper 60. Turning to FIG. 6, the compost is fed into trommel screen 67 and the compost fines fall through the screen and into the curing container 62. Once full, the curing container 62 is removed from under the trommel screen 67 and brought outside the processing building 36 by roll-off truck, not shown, for the duration of the curing. The oversized material or bulking agent leaves the end of the screen and is conveyed by belt conveyor 65 over the mixers 64. The material may be diverted from the belt conveyor 65 into the mixers 64 or stored in the bulking agent hopper 70.

FIG. 7 shows a mixer container 64 and a front loader 74, which include a trackway 76 and forklifts 78 to lift a container 51 to empty the raw organic waste in the mixer 64.

Figure 8:
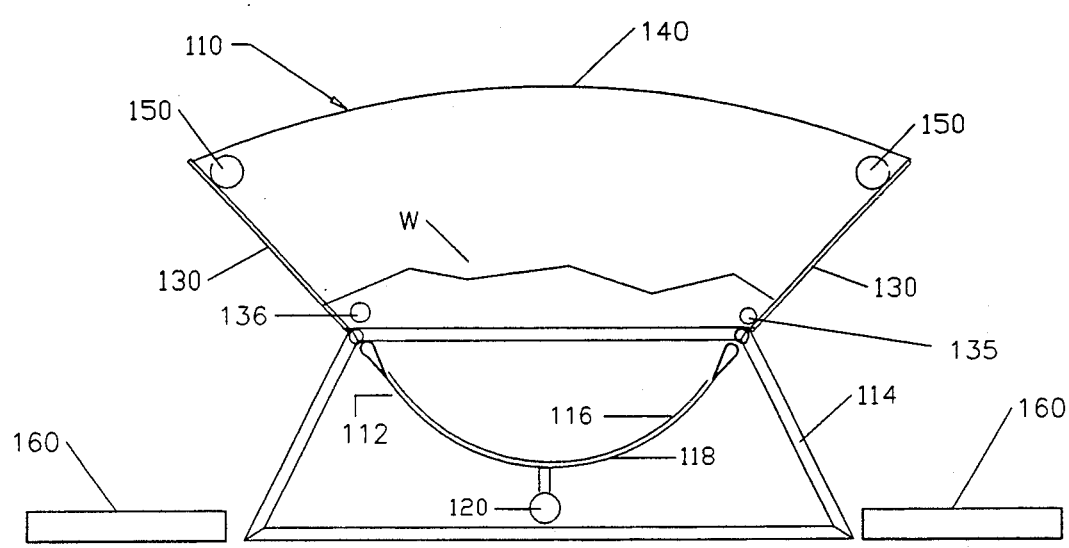
FIGS. 8, 9, 10 and 11 show schematic views of a second embodiment of the invention.

Another embodiment of the invention is shown in FIG's. 8-10. FIG. 8 depicts an apparatus and compost system 110 formed by high strength fabric 112 suspended on a tubular steel frame 114. A top layer of fabric 116 is perforated and allows a particular amount of pressurized air to pass into composting waste "W" to promote aerobic decomposition. A lower layer of fabric 118 is impervious and forms the lower half of an inflatable cylinder. Pressurized air is forced into the inflatable cylinder formed in layers 116 and 118 through an orifice 120 to force the top layer of fabric 116 to rise.

Figure 9:
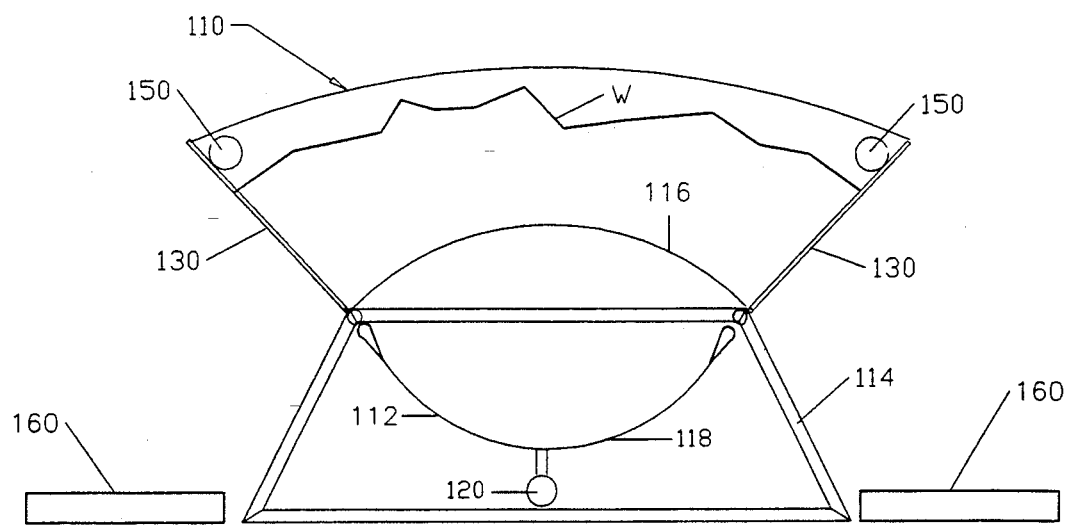

As shown in FIG. 9, as top layer of fabric rises, waste "W" is forced upward, turning and tumbling toward sloping walls 130 of frame 114. Pressurized air passes through the top layer and aerates the waste "W" as the waste is turned. Thermisters 135 mounted in contact with the waste "W" detect changes in the temperature of the waste "W" and signal electronic controller and activate blower, not shown. When the cylinder is fully inflated, controls, not shown, turn off a blower and stop the flow of pressurized air. The cylinder begins slowly to deflate as pressurized air continues to permeate into waste "W" through the top layer 116 of fabric to aerate waste "W". Additional pressurized air nozzles 136 are periodically used to remove by blowing any solid waste "W" which may remain on the sloping walls of the container.

A fabric cover 140 is drawn over the waste "W" to enclose the compost process. Odorous exhaust air is collected beneath the cover and drawn out of the enclosure through a perforated exhaust duct 150. The exhaust air is further processed to reduce odors, not shown, before dispersion to the atmosphere.

Figure 10:
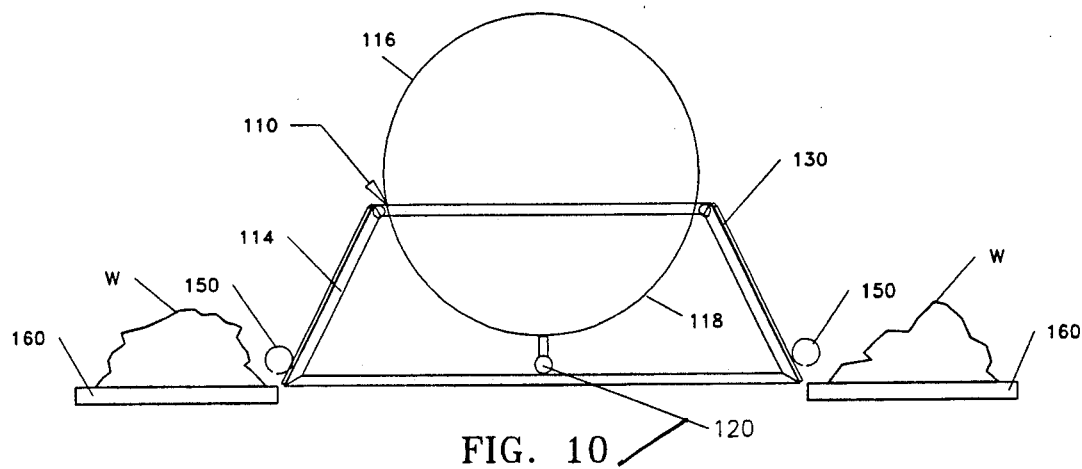
Figure 11:
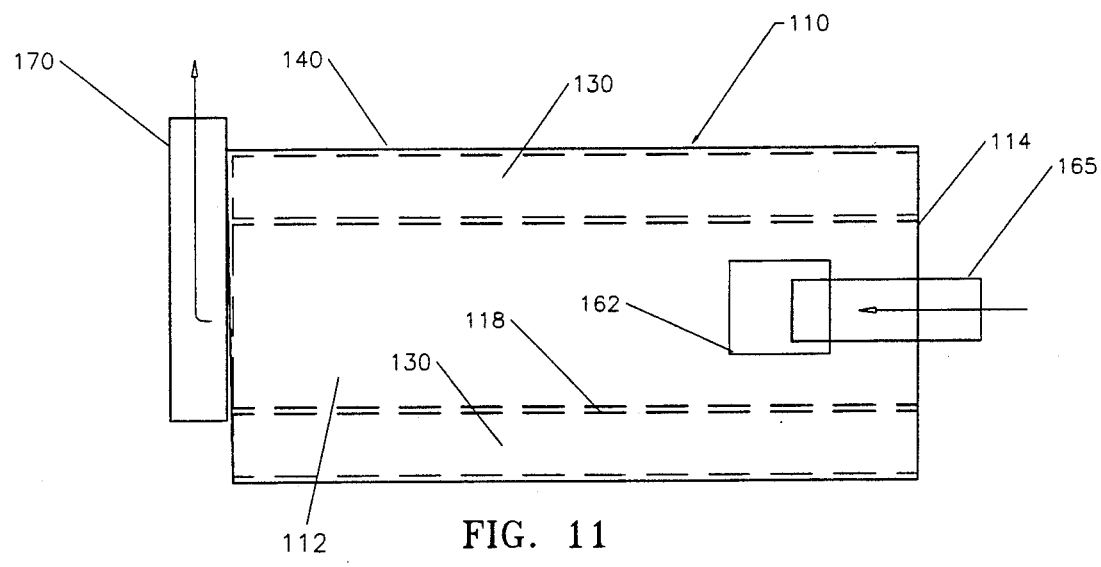

As shown in FIG. 10, the waste "W" is discharged by disconnecting fabric cover 140 from sloping walls 130 and allowing the sloping walls to swing inwardly. Top layer of fabric 116 pushes the compost up and out of frame 114 and onto a conveyor 160. The conveyor transports the composted material to a storage hopper, not shown, or to equipment for further processing, not shown. Another method of operating the inflatable apparatus as a continuous type reactor is shown in plan on FIG. 11. The solid waste "W" is loaded by conveyor 165 through hatch 162 in cover 140 and onto the inflatable cylinder 112. The hatch 162 is located away from the end of the inflatable cylinder 112 to prevent the weight of the solid waste from completely deflating cylinder 112 beneath the conveyor 165. As the inflatable cylinder 112 inflates, the portion which is not supporting any organic waste 112 rises first and pushes the organic waste toward the discharge container 170 at the end of the inflatable cylinder 112. As organic waste "W" is added through the hatch 162, composted waste is removed from discharge container 170.

The solid waste includes food, yard and paper waste. Other waste that may be treated by the method and apparatus of this invention includes materials such as dirt containing oil and hazardous chemicals.

It will, of course, be understood that various changes may be made in the form, details, arrangements and proportions of the various parts without departing from the scope of the invention.

I claim:

1. A composting apparatus, comprising:
   a container for organic wastes having side walls and a bottom wall,
   an inflatable bladder positioned above the bottom wall of the container, the bladder comprises of a pervious top layer and an impervious lower layer for supporting, agitating and aerating organic wastes, and
   a temperature controlled aeration system, wherein the temperature controlled aeration system comprises of a heat sensing means and a blower, the heat sensing means is mounted on the side walls within the container to detect temperature changes in the organic waste and activate the blower, the blower delivers pressurized air to the inflatable bladder causing the bladder to inflate and agitate the organic waste supported by the bladder while at the same time aerating the organic waste as air exits the pervious top layer of the bladder and enters the organic waste.

2. A composting apparatus as recited in claim 1, further comprising:
   a cover to enclose the container, and
   exhaust means positioned beneath the cover for collecting odorous off-gases.

3. A composting apparatus as recited in claim 2, wherein the heat sensing means is mounted on the side walls in the form of a conduit stretching across the container.

4. A transportable composting apparatus, comprising:
   a transportable container for organic waste having side walls, a bottom wall, and a moveable cover,
   a second floor within the container positioned above the bottom wall for supporting organic waste and forming a space between the second floor and the bottom floor, the second floor having perforations therethrough,
   a means for allowing pressurized air to be delivered into the space between the second floor and the bottom wall to aerate organic waste inside the container, and
   a pervious inflatable fabric secured over the second floor, wherein the fabric inflates and agitates the organic waste supported by the fabric when pressurized air is introduced into the space between the second floor and the bottom floor while simultaneously aerating the organic waste as air exits the pervious fabric.

* * * * *